United States Patent [19]

Kolschbach et al.

[11] Patent Number: 5,046,674
[45] Date of Patent: Sep. 10, 1991

[54] METHOD OF BLOWING A LINE INTO AN EMPTY SHEATH

[75] Inventors: Veit M. Kolschbach, Cologne; Dieter E. Lachmann, Siegburg; Gerald Znoyek, Leverkusen, all of Fed. Rep. of Germany

[73] Assignee: U.S. Philips Corporation, New York, N.Y.

[21] Appl. No.: 446,508

[22] Filed: Dec. 5, 1989

[30] Foreign Application Priority Data

Dec. 24, 1988 [DE] Fed. Rep. of Germany ....... 3843777

[51] Int. Cl.⁵ .................... B65H 49/02; B65H 55/02
[52] U.S. Cl. .................................. 242/54 R; 242/159; 254/134.4; 226/97
[58] Field of Search .............. 242/54 R, 128, 129, 242/159; 226/97; 254/134.4, 134.3 R

[56] References Cited

U.S. PATENT DOCUMENTS

| 3,079,673 | 3/1963 | Loehlein et al. | 226/97 X |
| 3,156,185 | 11/1964 | Hermann et al. | |
| 3,232,557 | 2/1966 | Winn | 226/97 X |
| 3,412,954 | 11/1968 | Hood | 242/159 |
| 3,559,917 | 2/1971 | Mackie | 242/159 |
| 3,703,264 | 11/1972 | Winn | 226/97 X |
| 3,750,058 | 7/1973 | Bankert | |
| 3,785,137 | 1/1974 | Karlson | 57/71 |
| 3,845,912 | 11/1974 | Eichmanns et al. | 242/18 R |
| 3,887,265 | 6/1975 | Margolis et al. | 350/96 B |
| 4,076,382 | 2/1978 | Oestreich | 350/96.23 |
| 4,185,796 | 1/1980 | Riley | 244/3.12 |
| 4,230,395 | 10/1980 | Dean et al. | 350/96.23 |
| 4,318,588 | 3/1982 | Zeidler et al. | 350/96.23 |
| 4,326,657 | 4/1982 | Arpin et al. | 226/97 |
| 4,691,896 | 9/1987 | Reeve et al. | 254/134.4 |
| 4,696,438 | 9/1987 | Myers | 242/159 X |
| 4,726,564 | 2/1988 | Lynn | 254/134.4 |
| 4,856,760 | 8/1989 | Frost et al. | 254/134.4 |
| 4,883,337 | 11/1989 | Dahlgren | 350/96.29 |

FOREIGN PATENT DOCUMENTS 1226673 10/1966 Fed. Rep. of Germany ... 254/134.4

OTHER PUBLICATIONS

"Advances in Blown Fibre Installation Methods", by R. A. Freeman et al., Br. Telecom Technology J. vol. 5 No. 3 Jul. 1987.

Primary Examiner—John M. Jillions
Attorney, Agent, or Firm—Ernestine Bartlett

[57] ABSTRACT

The invention relates to a method of blowing a line (1) into an empty sheath (13) in which the line (1) is unreeled from a storage roll and is transported in the empty sheath (13) by means of compressed air blown into the empty sheath (13). An undisturbed unreeling of the line from the roll is made possible also at very high unreeling speeds in that the storage roll is a self-supporting criss-crossed roll (4) having no coil former and contains a line comprising a sheath which envelops a LWG or an electrical conductor which sheath when wound in the criss-crossed roll comprises a flattened cross-sectional contour which is widened in the direction of the winding plane.

24 Claims, 1 Drawing Sheet

METHOD OF BLOWING A LINE INTO AN EMPTY SHEATH

FIELD OF THE INVENTION

The invention relates to a method of blowing a line into an empty sheath in which method the line is unreeled from a storage reel and is transported into the empty sheath by means of compressed air blown into the empty sheath.

BACKGROUND OF THE INVENTION

In such a method described in Br. Telecom. Technol. J. 87, vol. 5, pp. 19-24 July, 1987 an optical line is first laid in loose turns in a receiving container in which a torsional twist per turn is provided. Upon blowing the line into a cable sheath it is unreeled from the said receiving container without the receiving container being rotated. No large masses need be accelerated. By means of the blowing method, lines in considerable lengths can be drawn into channels or empty sheaths of a cable. Special and disturbance-sensitive guiding devices are required for unreeling the line. At higher unreeling speeds the turns which are freely movable with respect to each other in the receiving container can move and be jammed.

SUMMARY OF THE INVENTION

An object of the invention is to simplify the method of blowing a line into an empty sheath in which the line is unreeled from a storage reel and is transported into the empty sheath by compressed air blown into the empty sheath. A further object is to enable an undisturbed run of the line from the storage reel at high unreeling speeds.

These objects are achieved in a method wherein the storage reel consists of a self supporting criss-crossed roll without a coil former.

The line may comprise at least one electric conductor or at least one light waveguide (LWG).

A criss-crossed roll used according to the invention may be manufactured for the termination of the line manufacture. It may then be used directly without rewinding measures for blowing the line into an empty sheath. Such a criss-crossed roll having no coil former constitutes a self-supporting, stable unit and enables the storage of a large length of line in a small volume. At high unreeling speeds the line can be unreeled without disturbances and without jamming occurring. The required unreeling forces are particularly small so that, usually without additional mechanical transport devices, the transporting forces produced by the compressed air alone will suffice.

Since no special receiving containers are necessary for the criss-crossed roll, the criss-crossed roll according to the invention may be provided in a container which via an inlet aperture can be provided with compressed air and which comprises an outlet aperture for connecting the empty sheath. One essential advantage obtained is that the line need not be introduced into a pressurized container via an inlet channel which is to be sealed and hence causes additional frictional forces.

The criss-crossed roll can be manufactured in a particularly readily ordered structure when the line comprises a sheath which envelops its conductor, which sheath in the bond of the criss-crossed roll, in particular at the cross-points of the turns, comprises a cross sectional contour which is widened and flattened in the direction of the plane of winding.

An embodiment which can be simply manufactured is characterized in that the roll is wound with a line the circular sheath of which has an E-modulus of less than 1 GPa. During the winding process the originally circular sheath is deformed to the desired flat form. Suitable materials for that purpose are materials which have a low E-modulus of less than 1 GPa, in particular thermoplastic polyurethane or soft polyvinyl chloride.

In a particularly preferred embodiment, it is provided that a conductor is surrounded with some space by a hose-like sheath. The desired flat cross-sectional contour is obtained during the winding process even when harder materials are used for the sheath. It is particularly preferred with an LWG that a gel-like mass is provided between the hose-like sheath and the conductor and LWG, respectively. Use of such a gel-like mass permits the desired deformation of the hose-like sheath to a flat cross-sectional contour, and, in contrast with a solid envelope, causes lower damping increases in the case of an LWG. Comparatively hard materials may be used for the synthetic resin sheath, for example, in particular polybutylene terephthalate and elastomer-modified polybutylene terephthalate. Polyamides have also proved to be very suitable.

It is possible as such that additionally at least one strain relief element, in particular in the form of at least one fiberlike element, is provided inside the sheath, in particular in an LWG.

In a preferred means of fixing a line with an LWG in its position in the roll, additionally a metal wire is provided inside the sheath which metal wire is plastically deformed during the winding process.

The securing of the position of the line in the roll is further improved in that the coefficient of friction of the sheath is larger than $\mu=0.3$. Additionally the holding forces of polar materials (for example, polyurethane) may contribute to the cohesion of the roll.

It has been found that the pitch angle $\alpha$ of the line relative to a cross-sectional plane of the criss-crossed roll should be as large as possible for reasons of stability and on the other hand should be as small as possible to enable a rapid undisturbed unreeling of the line. An advantageous compromise solution is that the pitch angle $\alpha$ of a line relative to a cross-sectional plane of the criss-crossed coil in each winding layer is in the range from 2° to 30°, preferably in the range from 4° to 10°.

An advantageous method of manufacturing this embodiment of the criss-crossed roll is characterized in that, depending on the diameter of the criss-crossed roll achieved during the winding process, the pitch angle $\alpha$ is adjusted so that it lies in the range from 2° to 30°, preferably in the range from 4° to 10°.

The re-adjustment of the pitch angle makes it possible to manufacture of coils having large numbers of layers while maintaining the above mentioned limits for the pitch angle $\alpha$. In this manner it is possible to prevent the occurrence wherein the pitch angle $\alpha$ increases steadily with increasing diameter of the roll as a result of which the roll would become unstable.

Torsions are formed during the unreeling of the line from a non-rotating roll. It is therefore ensured that the LWG conductor in the roll is wound with torsion throughout its length.

During the manufacture of the roll a counter-compensating torsion is provided so that the unreeled line is torsion-free.

The flat-form of the line which is particularly preferred can be achieved in a particularly simple manner and without additional measures when it is wound with a multiline which consists of several individual lines connected beside each other.

BRIEF DESCRIPTION OF THE INVENTION

The invention will be described in greater detail, with reference to the description of advantageous embodiments shown in the drawing, in which FIG. 1 shows diagrammatically a device for carrying out the method according to the invention, FIG. 2 is a side elevation of a criss-crossed roll shown in FIG. 1 cut in two halves, FIG. 3 is a cross-sectional view of a line which in the starting position comprises a widened sheath, FIG. 4 is a cross-sectional view of a line having in the initial position a circular soft synthetic resin sheath, FIG. 5 shows a cross-sectional form which is obtained in the wound position of an LWG surrounded by an intermediate gel layer and a synthetic resin sheath.

DETAILED DESCRIPTION OF PREFERRED EMBODIMENTS

Figure 1:
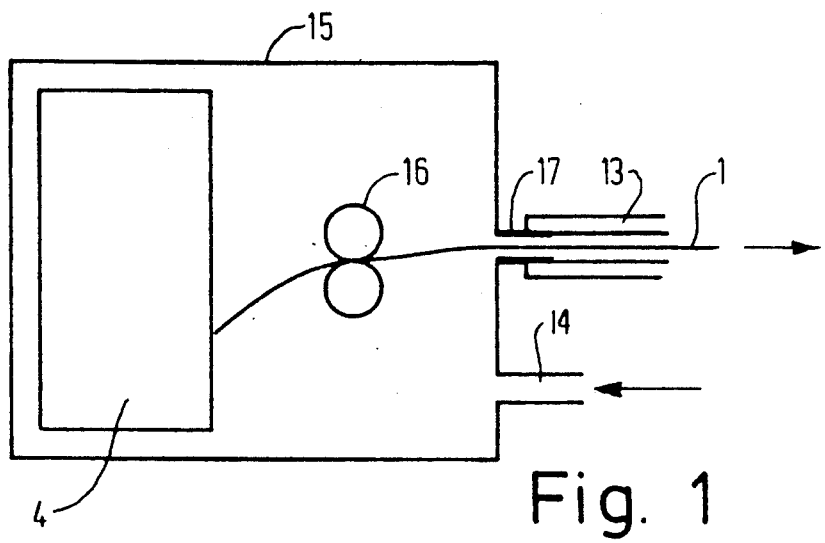

In FIG. 1 there is illustrated the end area of an empty sheath 13 (for example, extruded synthetic resin hose or steel tube) into which a line 1, for example, an enveloped LWG or an insulated electric conductor, is to be blown. For that purpose a container 15 is provided which is pressurised via the pipe 11 and in which a criss-crossed roll 4 is present comprising the required store of the line 1 having ends 5 and 5A. If so desired, the unreeling of the line 1 in the empty sheath 13 may be supported by transporting wheels 16.

The empty sheath is connected so as to be in sealing relationship with the outlet stud 17 of the container 15.

Figure 2:
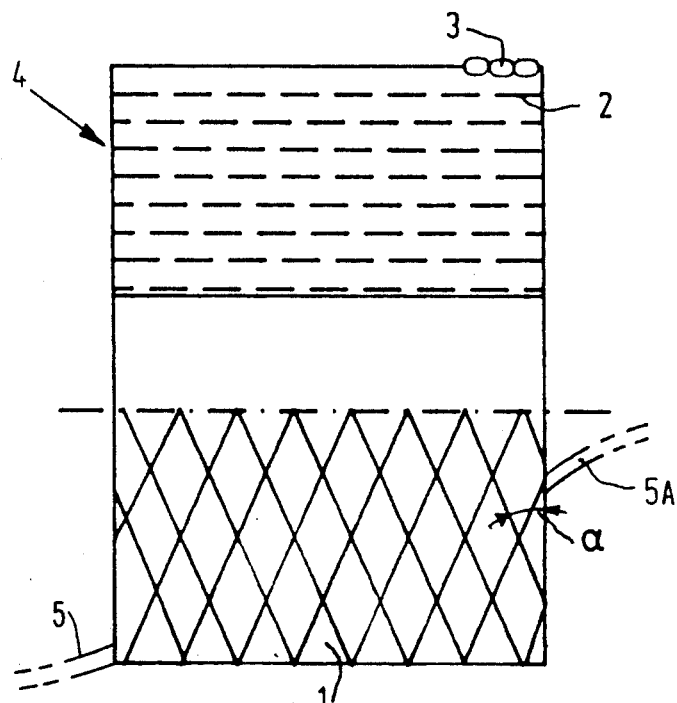

In the criss-crossed roll 4, shown diagrammatically in FIG. 2 and not drawn to scale, a line 1 is shown in the lower half of the position of the turns typical of the criss-crossed roll, which line is wound with a pitch angle $\alpha$. In the upper half, shown in a longitudinal sectional view, winding planes of a multiple of winding layers situated radially one over the other are shown in broken lines 2. Cross-sectional shapes 3 of the line 1 are shown of the outermost winding layer. The wider cross-sectional sides extend in the direction of the planes of their winding layers.

The pitch angle of the turns 1 with respect to a cross-sectional plane of the criss-crossed roll 4 was adjusted in all layers at a value which deviates only little from 8°. The ratio of the winding speed and of the speed of the axial guiding of the line 1 was varied with constant adaptation so that the angle $\alpha$ was kept within the range from 4° to 10°. Such an adaptation may be done constantly. In the preferred embodiment it was done in steps after the manufacture of each time a few winding layers, since a certain fluctuation area of the pitch angle $\alpha$ is permitted.

Figures 3, 4, 5:
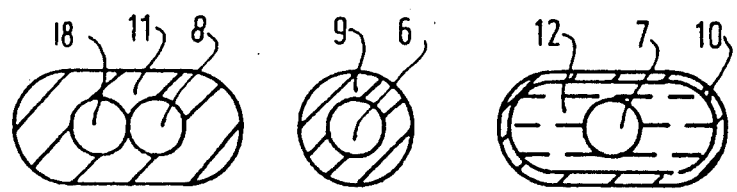

Several cross-sectional shapes of a line 1 comprising an LWG are shown on an enlarged scale in FIGS. 3, 4 and 5 as compared with position 3 in FIG. 2. The LWGs 6, 7 and 8, respectively, have a diameter of approximately 250 μm when their synthetic resin coatings are included. They are enveloped by extruded sheaths 9, 10 and 11, respectively.

In the embodiment shown in FIG. 3, a plastically deformable metal wire 18 is arranged in the synthetic resin sheath 11 parallel to the LWG 8. In this embodiment, a flattened cross-sectional form is obtained which facilitates the winding of a uniform criss-crossed coil. The plastically deformable metal wire 18 follows the winding layer of the conductor shown in FIG. 2 against the elastic resetting forces of the LWG 8, also at the reversal points of the winding pitch, even when the surface of the synthetic resin sheath 11 is comparatively smooth and adhesive-free.

In the embodiment of an LWG conductor shown in FIG. 4, the LWG 6 is sheathed only by a particularly soft and not too thin synthetic resin sheath which is deformed in a longitudinal cross-section similar to FIGS. 3 and 5 during winding of the criss-crossed coil so that at least approximately equally good winding results are achieved as are achieved in an elongate cross-sectional form present originally.

Synthetic resins having an E modulus of less than 1 GPa have proved to be very suitable for the sheath 9. Therefore, thermoplastic polyurethane or soft polyvinyl chloride are particularly preferred.

In the modified embodiment shown in FIG. 5, more rigid sheaths 10 may be used since the flexibility of the cross-sectional shape is achieved by a gel-like intermediate layer 12 which additionally prevents the damping increases of the LWG.

FIG. 5 shows the cross-sectional form which adjusts in the criss-crossed roll. Originally a circular synthetic sheath 10 surrounding the LWG 7 concentrically was extruded around same.

When the coefficient of friction of the sheath 9 or of the sheath 10 is larger than $\mu = 0.3$, the criss-crossed roll coheres excellently also without a coating of adhesive and can be unreeled without any disturbances at high speed.

We claim:

1. In a method of blowing a line (1) into an empty sheath (13), in which method the line (1) is unreeled from a storage reel and is transported in the empty sheath (13) by means of compressed air blown into the empty sheath (13), the improvement wherein the storage roll consists of a self-supporting criss-crossed roll (4) having no coil former and the line comprises a sheath which envelopes a light waveguide (6) or an electrical conductor (7) which sheath when wound in the criss-crossed roll (4) has a flattened cross-sectional contour which is widened in the direction of the winding plane (2).

2. A method as claimed in claim 1, wherein the criss-crossed roll is wound with a line (1) a circular sheath (9) of which comprises an E modulus smaller than 1 GPa.

3. A method as claimed in claim 2 wherein the sheath (9) consists of thermoplastic polyurethane or soft polyvinyl chloride.

4. A method as claimed in claim 2 wherein the conductor (7) is surrounded with a hose-like sheath (10).

5. A method as claimed in claim 4 wherein a gel-like mass (12) is provided between the hose-like sheath (10) and the conductor (7).

6. A method as claimed in claim 4 wherein the hose-like sheath (10) consists of polybutylene terephthalate or elastomer-modified polybutylene terephthalate.

7. A method as claimed in claim 1 wherein said sheath (11) envelopes an LWG, and inside the sheath (11) a metal wire (18) is provided which is plastically deformed during the winding process.

8. A method as claimed in claim 1 wherein the coefficient of friction of the sheath (9, 10, 11) is larger than $\mu = 0.3$.

9. A method as claimed in claim 1 wherein the line (1) in the roll is wound with a torsion throughout its length.

10. A method as claimed in claim 1 wherein the pitch angle α of the turns and of the line (1) relative to a cross-sectional plane of the criss-crossed coil in each winding layer lies in the range from 2° to 30°.

11. A method as claimed in claim 1 wherein said line (1) is wound with a multiline which consists of several individual lines connected beside each other.

12. A self-supporting criss-crossed roll (4) for blowing a line (1) into an empty sheath (13) by means of compressed air, said criss-crossed roll (4) being a storage reel having crossed turns without a coil former and having a line (1) wound thereon, the line (1) comprising a sheath (9, 10, 11) which envelopes a LWG or an electrical conductor (6, 7, 8) which sheath when wound in the criss-crossed roll (4) comprises a flattened cross-sectional contour at least at the crossing points of said turns which contour is widened in the direction of the plane of winding.

13. A criss-crossed roll as claimed in claim 12 wherein the pitch angle α of the turns and of the line (1) relative to a cross-sectional plane of the criss-crossed coil in each winding layer lies in the range of 4° to 10°.

14. A criss-crossed roll as claimed in claim 12, wound with a line (1) the circular sheath (9) of which comprises an E modulus smaller than 1 GPa.

15. A criss-crossed roll as claimed in claim 14, wherein the sheath (9) consists of thermoplastic polyurethane or soft polyvinyl chloride.

16. A criss-crossed roll as claimed in claim 12, wherein the conductor (7) is surrounded by a hose-like sheath (10).

17. A criss-crossed roll as claimed in claim 16, wherein a gel-like mass (12) is provided between the hose-like sheath (10) and the conductor (7).

18. A criss-crossed roll as claimed in claim 16, wherein the hose-like sheath (10) consists of polybutylene terephthalate or elastomer-modified polybutylene terephthalate.

19. A criss-crossed roll as claimed in claim 12, having an LWG, and wherein inside the sheath (11) a metal wire (13) is provided which is plastically deformed during the winding process.

20. A criss-crossed roll as claimed in claim 12, wherein the coefficient of friction of the sheath (9, 10, 11) is larger than $\mu = 0.3$.

21. A criss-crossed roll as claimed in claim 12, wherein the line (1) in the roll is wound with a torsion throughout its length.

22. A criss-crossed roll as claimed in claim 12, wherein the pitch angle α of the turns and of the line (1) relative to a cross-sectional plane of the criss-crossed coil in each winding layer lies in the range from 2° to 30°.

23. A criss-crossed roll as claimed in claim 12, characterized wound with a multiline which consists of several individual lines connected beside each other.

24. A method of blowing a line into an empty sheath which comprises the steps of:
(a) providing a container comprising (1) an inlet for receiving compressed air; (2) a self-supporting criss-crossed roll having crossed turns without a coil former and having a store of line material wound thereon, the line comprising a sheath which envelopes a light waveguide or an electrical conductor which sheath when wound in the criss-crossed roll has a flattened cross-sectional contour at least at the crossing points of said turns which contour is widened in the direction of the plane of winding; and (3) an outlet through which said line material and compressed air exit the container;
(b) providing an empty sheath opposite the container outlet, and
(c) unreeling the line material from the criss-crossed roll and transporting the line material into said empty sheath by means of compressed air blown into the sheath from said container.

* * * * *